3,777,039
HIGH AMYLOSE STARCH ADDITIVE IN LEAVENED PASTRY DOUGHS

Eric M. Van Patten, Tinley Park, and James A. Freck, Naperville, Ill., assignors to American Maize-Products Company
No Drawing. Filed Jan. 14, 1972, Ser. No. 217,999
Int. Cl. A21d *13/08*
U.S. Cl. 426—62     6 Claims

ABSTRACT OF THE DISCLOSURE

A new and improved dough for leavened pastries such as pizza is disclosed. The dough has from about 2% to about 14% of a high amylose material containing 50% or more amylose and thereby the stickiness of the dough is materially reduced, the proofing time is reduced, and yet a tender structurally stable crust is formed. Additionally, after baking, the crust has less of a tendency to shrink than normal pizza pastries and the thickness of the crust varies substantially less than standard pizza pastries.

---

The present invention reates to a new and improved dough for pastries such as pizzas. To the normal leavened pastry dough there is added by weight of flour from about 2% to about 14% of a high amylose material which contains at least about 50% amylose. As a result of the addition of the high amylose material to the pastry dough, proofing time is reduced, the stickiness of the dough is reduced, thereby making it less difficult to form the pizza pie and, after baking, the pizza pie has less tendency to shrink than normal pizza pies and additionally its thickness remains more constant than a standard pizza pie.

The preparation of leavened doughs for such pastries as pizza, for example, has been a difficult and tedious operation. When first mixed, the dough tends to be sticky and hard to handle. Considerable proofing or fermentation time is required in order for the dough to rise to the desired degree. Frequently the doughs are difficult to roll out into the desired shape and thickness because of the stickiness and a tendency to be "bucky" or to contract when spread out. Furthermore, most doughs have a tendency to shrink when baked out and frequently the finished product is appreciably smaller in diameter after baking than before. Attempts to reduce the proofing time with conventional formulas leads to a crust which lacks structural strength such that the air cells tend to collapse when contacted by the moist paste.

In accordance with the present invention, these disadvantages of standard leavened doughs are reduced by replacing some of the flour of the conventional dough formulation with from about 2% to about 14% of a high amylose material. For purposes of the present invention, a high amylose material is defined as a mixture of solids which includes at least 50% by weight of pure amylose or amylose derivatives such as hydroxypropyl amylose and amylose ethers, amylose acetates and similar esters. Excellent results have been obtained from an amylose material available under the trademark Amylomaze VII from American Maize-Products Company. This product is a corn starch and contains approximately 70% pure amylose.

The incorporation of 2% to 14% of the high amylose material substantially reduces the stickiness of the dough, permits a much shorter proofing time, and gives a tender, yet structurally stable crust. Upon baking out, the crust shows substantially less tendency to shrink. This is very important since even a small reduction (on the order of ¼ to ½ inch on a 12-inch pie) in shinkage of the pizza crust means that there will be less "bunching" of the pie and thickness of the baked-out pie will be substantially more constant.

It has been additionally discovered that when from about 2% to about 14% of the high amylose material is included in the leavened dough, the mixing time can be reduced to as little as two minutes and the proofing time can be substantially reduced and even eliminated and yet there will still result a substantially dimensionally stable attractive looking crust. This discovery is especially useful since it allows pizza doughs to be continuously prepared. Up until the present time, pizza doughs have not lent themselves to continuous preparation primarily because of the long proofing time, the critical mixing time, and the sticky bucky doughs which are obtained. These disadvantages are materially reduced when a high amylose material is added in accordance with the present invention, and as a result, the pizza doughs can be continuously prepared.

The following are examples showing the advantage of the present invention. Standard leavened pastry doughs such as for making pizza will usually comprise the following constituents based by weight on 100 parts of flour:

Flour: 100 parts.
Shortening: About 1 part to about 5 parts.
Water: About 45 parts to about 65 parts.
Yeast: About 1 part to about 3 parts.

Sugar and salt and sometimes also other ingredients are usually added to improve the flavor of the dough, etc. Shortening is defined as an edible non-toxic fat suitable for cooking.

In accordance with the present invention, the pastry doughs will generally have the following ingredients based by weight on 100 parts of flour:

Flour: 100 parts.
Shortening: About 1 part to about 6 parts.
Water: About 45 parts to about 75 parts.
Yeast: About 1 part to about 4 parts.
High amylose starch: About 2 parts to about 14 parts.

Best results have been obtained when the pastry doughs have the following ingredients based by weight on 100 parts of flour:

Flour: 100 parts.
Shortening: About 4 parts to about 5 parts.
Water: About 62 parts to about 72 parts.
Yeast: About 2.5 parts to about 2.9 parts.
High amylose starch: About 2 parts to about 14 parts.

In either case, sugar and salt and other additives may be included to enhance flavor, etc.

In order to form a standard basis for comparison, the following typical pizza dough recipe was used in each of the examples with any modifications thereof being stated in the individual examples:

|  |  | Parts by weight of flour |
|---|---|---|
| Flour, grams | 340 | 100 |
| Shortening, grams | 13.6 | 4 |
| Sugar, grams | 6.8 | 2 |
| Salt, grams | 3.4 | 1 |
| Water to hydrate yeast, ml | 34 | 10 |
| Additional water, ml | 170 | 50 |
| Yeast, grams | 8.4 | 2.5 |

The flour employed in all of the examples was a northwest spring wheat, standard patent, brominated. This is a typical commercially available flour used for making leavened doughs. In all of the examples except Example 8, a Hobart Model N–50 mixer was used. The mixer had a five quart bowl and was equipped with a paddle and dough hook.

EXAMPLE 1

A control dough was formed by admixing with a mixing blade 340 grams of flour, 3.4 grams of salt and 6.8 grams of sugar for five minutes. Over the next five minutes 13.6 grams of shortening were admixed in small portions. In a separate operation, 8.4 grams of yeast was hydrated in 34 ml. of water for five minutes. The hydrated yeast was added to the dries in the mixing bowl and then the remaining formula water was added to the mixing bowl. The mixing blade was employed for an additional half minute until the water had picked up the dries. Thereafter, the mixing blade was replaced with a dough hook and the dough hook was kneaded for an additional two minutes.

An additional batch of dough was prepared in the same manner except that in accordance with the present invention 22 grams of Amylomaize VII replaced 22 grams of flour, i.e., 318 grams of flour were employed. The Amylomaize VII was added after the shortening and mixing was continued for an additional two minutes after the addition of the Amylomaize VII.

Both the control dough and the dough of the present invention were divided into two equal parts by weight, formed into balls, and pinned to about ¾ the size needed to fill a 12-inch aluminum pizza pan. It was noted that doughs of the present invention were considerably less sticky than the control doughs and could be pinned and punched out more readily than could the control doughs. Additionally, dusting flour, which was quite necessary to facilitate sheeting of the control doughs, was found not to be necessary for sheeting of the doughs made in accordance with the present invention.

Each of the doughs was pricked and allowed to stand for five minutes and each of the doughs was then baked at 425° F. for five minutes to set the crust. The crusts were cooled to room temperature and thereafter they were frozen. Standard tomato pizza sauce was applied to the frozen crusts and the sauced pies were then baked for 14 minutes at 425° F. Measurements were made of the average diameter of each of the pies and the thickness of each of the pies was measured 1½ inches from each edge and at the center. The results of these measurments are given in Table I below:

TABLE I

| | Proof time (mins.) | Average diameter before baking, inches | Average diameter finished pizza crust, inches | Average thickness (mm.) of finished crust (edge-center-edge) |
|---|---|---|---|---|
| Control | 0 | 12 | 11 | 5-2-5 |
| Present invention | 0 | 12 | 11⅜ | 5-5-5 |

It can be readily seen from the table that the pizzas made in accordance with the present invention had substantially less shrinkage than the control pizzas and additionally had more uniform thickness.

EXAMPLE 2

Example 1 is repeated except that hydroxypropyl amylose is used in place of the Amylomaize VII. Comparable results are obtained.

EXAMPLE 3

Example 1 is repeated except that amylose acetate is used in place of the Amylomaize VII. Comparable results are obtained.

EXAMPLE 4

Example 1 is repeated except that before sheeting the dough is fermented for 15 minutes at a temperature ranging from 86° F. to 90° F. Results of the measurements as in Example 1 are given below in Table II:

TABLE II

| | Proof time (mins.) | Average diameter before baking, inches | Average diameter finished pizza crust, inches | Average thickness (mm.) of finished crust (edge-center-edge) |
|---|---|---|---|---|
| Control | 15 | 12 | 11 | 7-3-3 |
| Present invention | 15 | 12 | 11⅜ | 8-8-8 |

EXAMPLE 5

Example 1 is repeated except that the Amylomaize VII is admixed with the flour, salt and sugar before the addition of the shortening. Results comparable to Example 1 are obtained.

EXAMPLE 6

Example 1 is repeated except that the doughs of the present invention are prepared with 299 grams of flour and 41 grams of pure amylose and no Amylomaize VII is used. Comparable results are obtained.

EXAMPLE 7

Example 1 is repeated except that the doughs prepared in accordance with the present invention have 332.2 grams of flour, 6.8 grams of a material having an amylose content of 50% and no Amylomaize VII. Comparable results are obtained.

EXAMPLE 8

This example demonstrates that the doughs of the present invention give a product more suitable for home use than the types now available.

A control mix was prepared by admixing 340 grams flour, 3.4 grams salt and 6.8 grams of sugar in a Kitchen Aid mixer for five minutes. 13.6 grams of shortening were added in small pieces and the mixing was continued during an additional mixing time of 20 minutes. 4.2 grams of yeast was hydrated in ½ cup of water at 110° F. for five minutes. The hydrated yeast was placed in a mixing bowl and one-half of the control mix was admixed therewith by hand.

In accordance with the present invention, a dough was prepared in the same manner except that 40.8 grams Amylomaize VII was substituted for 40.8 grams of the flour, i.e., 299.2 grams of flour were employed.

Each of the doughs was kneaded four to five times by hand, formed into a ball which was placed into the center of a pizza pan and allowed to rise for five minutes and thereafter each dough was pressed to the shape of the pizza pan. The control dough was sticky and it was quite necessary to grease the hands in order to knead, shape and press the dough. In contrast to this, it was not necessary to grease the hands before kneading, shaping and pressing the dough of the present invention.

Each of the doughs was sauced with standard tomato sauce immediately after pressing and each of the doughs was baked at 425° F. for 18 minutes.

Measurements of each of the doughs were made in accordance with Example 1 and are summarized in Table III below.

TABLE III

| | Proof time (mins.) | Average diameter before baking, inches | Average diameter finished pizza crust, inches | Average thickness (mm.) of finished crust (edge-center-edge |
|---|---|---|---|---|
| Control | 5 | 12 | 11¾ | 8-7-8 |
| Present invention | 5 | 12 | 12 | 7-7-7 |

As can be seen from the table, the dough of the present invention had less shrinkage than the control dough, and was of more uniform thickness.

It will be understood that the claims are intended to cover all changes and modifications of the preferred embodiments of the invention, herein chosen for the purpose of illustration, which do not constitute departures from the spirit and scope of the invention.

We claim:

1. A leavened pastry dough comprising flour, yeast and water, suitable for use as a dough for pizza pie crusts, having incorporated therein from about 2% to about 14% based on the weight of the flour of a high amylose material, said high amylose material containing at least about 50% amylose selected from the group consisting of pure amylose and amylose derivatives.

2. The composition of claim 1 wherein the high amylose material contains at least 70% amylose.

3. A leavened pastry dough especially useful as a dough for pizza pie crusts comprising per 100 parts of flour:
    (a) 100 parts flour;
    (b) from about 1 part to about 6 parts shortening;
    (c) from about 45 parts to about 65 parts water;
    (d) from about 1 part to about 4 parts yeast; and
    (e) from about 2 to about 14 parts of a high amylose material, said high amylose material containing at least about 50% amylose selected from the group consisting of pure amylose and amylose derivatives.

4. The composition of claim 3 wherein sugar and salt are also included.

5. A leavened pastry dough especially useful as a dough for pizza pie crusts comprising per 100 parts of flour:
    (a) 100 parts flour;
    (b) from about 4 to about 5 parts shortening;
    (c) from about 62 parts to about 72 parts water;
    (d) from about 2.5 parts to about 2.9 parts yeast; and
    (e) from about 2 to about 14 parts of a high amylose material, said high amylose material containing at least about 50% amylose selected from the group consisting of pure amylose and amylose derivatives.

6. The composition of claim 5 wherein sugar and salt are also included.

References Cited
UNITED STATES PATENTS

| | | | |
|---|---|---|---|
| 3,615,684 | 10/1971 | Workin | 99—94 |
| 3,459,560 | 8/1969 | Shea | 99—92 |
| 3,275,451 | 9/1966 | Holstein | 99—94 |
| 3,615,679 | 10/1971 | Tangel et al. | 99—86 |

RAYMOND N. JONES, Primary Examiner